United States Patent [19]

Denney et al.

[11] 3,801,806
[45] Apr. 2, 1974

[54] ANALYSIS OF DATA

[75] Inventors: Ernest James Denney, Comberton; Richard William Stokes, Loughborough, both of England

[73] Assignee: Cambridge Scientific Instruments Limited, Cambridge, England

[22] Filed: Jan. 11, 1972

[21] Appl. No.: 216,984

[30] Foreign Application Priority Data
Jan. 12, 1971   Great Britain ..................... 1344/71

[52] U.S. Cl. ....... 235/183, 235/151.35, 235/92 NT, 328/165
[51] Int. Cl. ............................................. G06g 7/18
[58] Field of Search .......... 235/183, 151.35, 92 NT; 328/127, 165, 150, 151

[56]     References Cited
       UNITED STATES PATENTS
3,304,413   2/1967   Lehmann et al. ................ 235/183 X
3,651,318   3/1972   Czekajewski ....................... 235/183
3,185,820   5/1965   Williams et al. ............ 235/151.35 X
3,307,019   2/1967   Woodard et al. ..................... 235/183
3,511,979   5/1970   Rabe et al. ........................... 235/183
3,614,408   10/1971  Watkin et al. ............. 235/151.35 X

*Primary Examiner*—Felix D. Gruber
*Attorney, Agent, or Firm*—Scrivener Parker Scrivener & Clarke

[57]     ABSTRACT

In the analysis of data in the form of a peaked or humped curve such as a curve of Lorentzian or Gaussian shape, where it is desired to obtain a value representing the true area under the curve, eliminating distortion that may be present, a measurement is made of the area only between the peak value and a value representing a predetermined fraction of that peak; this can be done by scanning the curve, detecting the peak, starting the integration, then stopping it when the curve value has fallen to the predetermined fraction of that observed peak value; an appropriate factor is then applied to obtain the true area.

6 Claims, 7 Drawing Figures

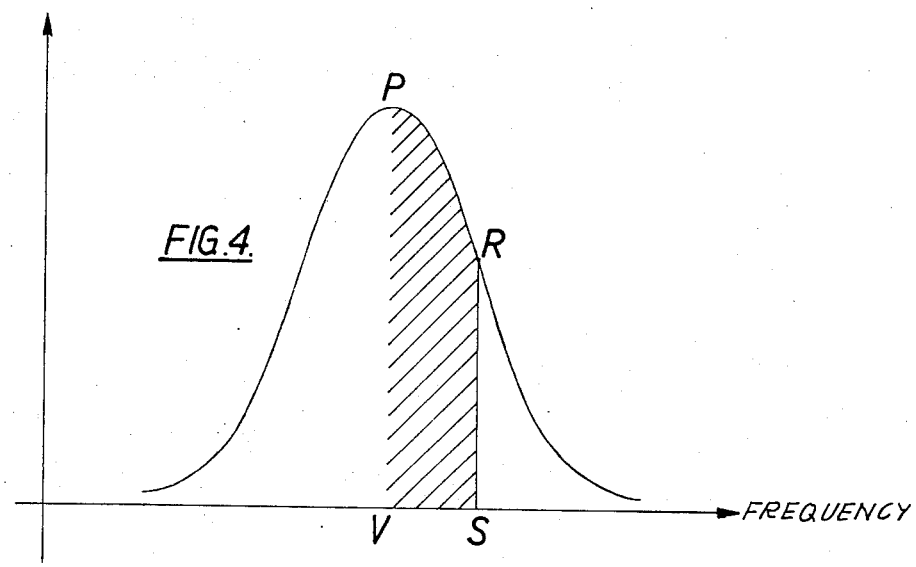
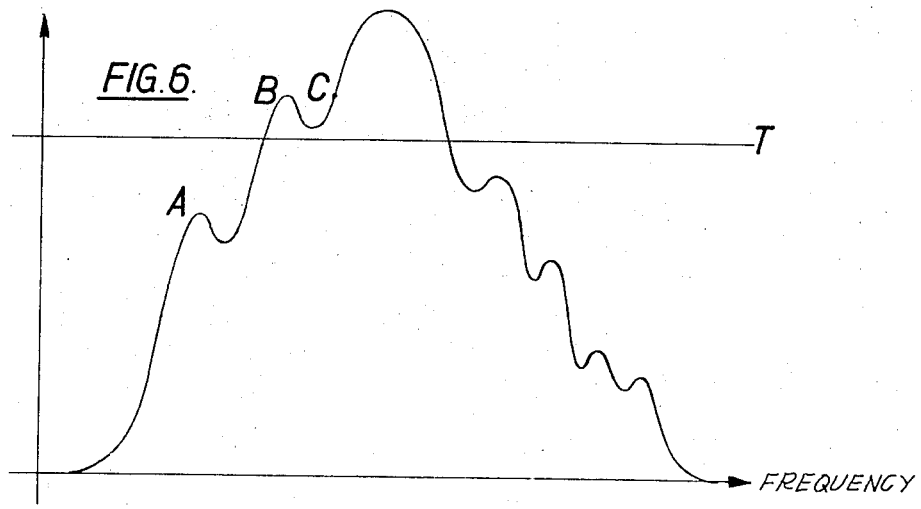

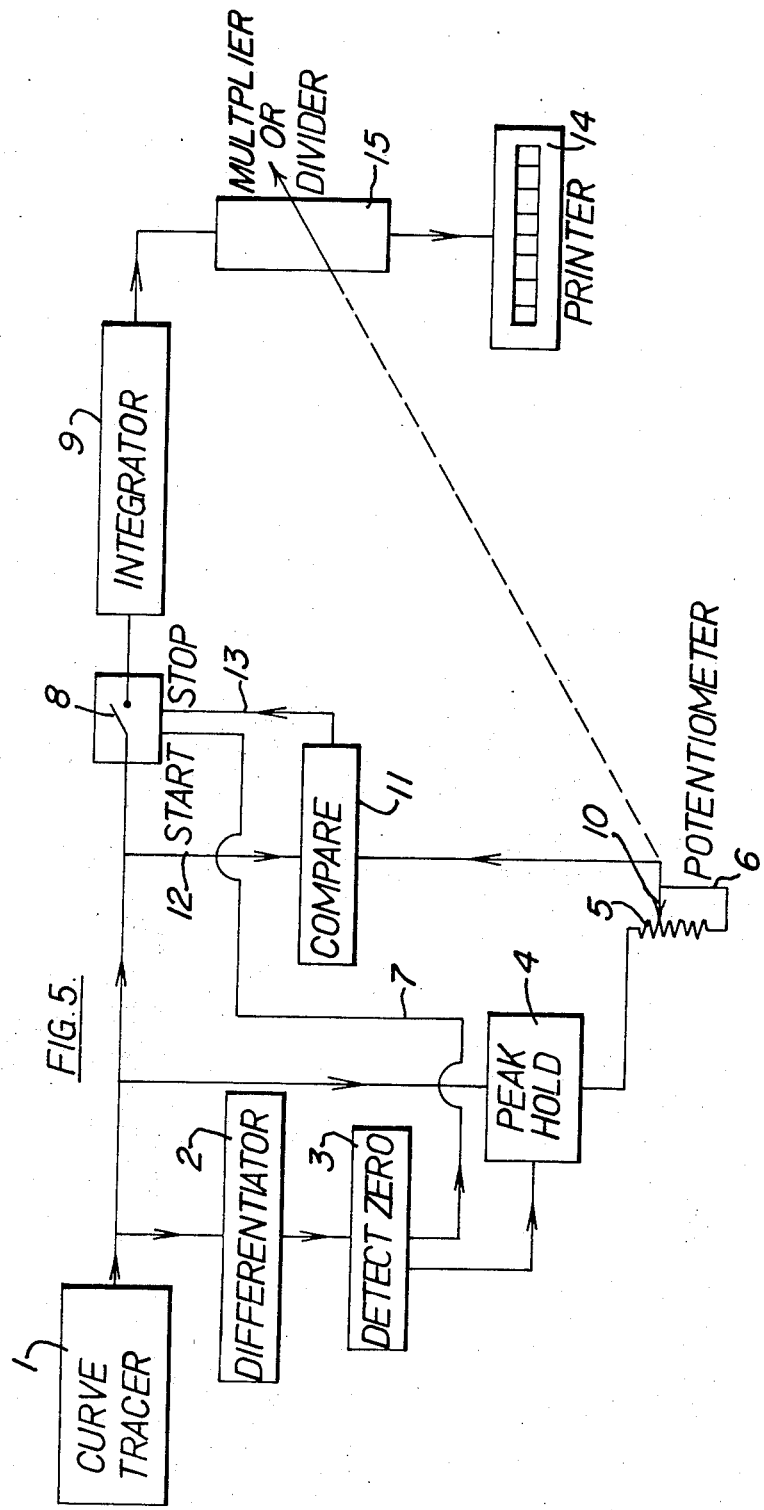

ANALYSIS OF DATA

This invention relates to the analysis of data in the form of curves obtained by measuring or recording equipment, and is concerned with the problem of obtaining from a given experimentally derived curve the correct information, eliminating or allowing for unwanted errors. In particular the invention is concerned with deriving the true area under a response curve of, for example, the Gaussian or Lorentzian form when it is known that the flanks of the curve are disturbed from their true form by unwanted factors.

Such a situation arises in the microwave spectroscopy of gases, where the Stark method of modulation is used. This method has advantages over source modulation and as the source is swept slowly through a range of frequencies, whilst a Stark electrode in the waveguide that contains the gas under examination switches rapidly on and off an electric field to which the gas is subjected, the resulting curve built up at the output of a detector is a main curve flanked on each side by one or more so-called "Stark" lobes of the same total amplitude. Where a phase-sensitive detector is used the Stark lobes are of opposite sign to the main curve.

The use of microwave spectroscopy for the quantitative analysis of gases and vapours has been restricted by the problem of relating measured absorption line intensities to the partial pressures of the gases. A major part of this problem consists of the changes which occur in both line height and width as the total pressure in the sample cell and the microwave radiation power incident on the cell are varied. Neither line widths nor line heights vary in a simple manner with pressure but over considerable ranges of pressure and power density the line areas are proportional to partial pressure (although still a function of power density).

Attempts to make quantitative measurements of line intensity and hence partial pressure have not generally made use of line area measurements. Either calibration curves relating line height to partial pressure for a very limited range of conditions or a method relating partial pressure to the variation of line height with incident power (Harrington technique) have been used.

This latter method has the disadvantages that high powers may be needed to cover the whole range of variation to the "saturation" condition and when this is not available the method is limited to low sample pressures or to extrapolating the range of measurements possible along a theoretical curve. If the problem of area measurement could be solved this would permit the use of higher sample pressures at practical powere levels, giving increased absorption and lower limits of detection for chemical compounds in mixtures.

Apart from the usual problems involved in sensing the zero base-line, common to all forms of integration of time-dependent peaked signals, there is a particular problem in measuring the area in Stark or Zeeman microwave spectroscopy, as, if both the line and the lobes are sufficiently broadened by pressure and incident power, the flanks of the nearest lobes will overlap and therefore distort the flanks of the main line. Any integrating method that measures the area under the main line curve between its base-line crossing points will be substantially in error.

Where the shapes of the curves known and the relative amplitudes of the main line and lobes are known and their degree of overlap is known, then the degree of error is reasonably easy to calculate and a correction can be applied. However these factors are not always known and furthermore the correction is a troublesome additional step. The aim of the present invention is to provide a method of integration that largely eliminates the error directly.

According to the invention there is proposed a method of assessing the true integrated area under a peaked curve of known or assumed type but not of predetermined peak height and width, representing observed or measured physical data and known to be liable to distortion of its flanks comprising the steps of scanning said curve from one side, detecting the presence and value of a peak of said curve, starting an integration sequence, to integrate the area under the curve from that peak value onwards, and halting such integration when the observed ordinate value of the curve has fallen to a value which is a known predetermined fraction of the said peak value. The result obtained by the integration can be employed directly, being known to represent a fixed fraction of the true area, or it may be multiplied by a factor, appropriate to the predetermined fraction, to obtain the value of the true area.

The method can be repeated for different values of the fraction, and consistency or otherwise of the results will be an indication of how far the distortion extends; those results which differ markedly from the remainder can be discarded.

The method is well suited to automatic operation.

Apparatus according to the invention, for carrying out this method, can take the form of means for tracing a humped curve along the abscissa axis, and obtaining an electrical signal dependent in value on the ordinate of curve, means for detecting the peak value of the ordinate, and starting an integration sequence of the area under the curve from that peak value, means deriving a signal representing a predetermined fraction of the peak value, and means for halting the integration when the ordinate of the curve has fallen to the said fraction.

The attainment of the peak value can be detected by differentiating the ordinate signal and detecting when this differentiated signal passes through zero. To obtain the known fraction, the peak value of the ordinate, stored while the integration continues, is applied to a potentiometer, of which the slider derives the known fraction, and a comparator detects when the ordinate signal falls to this value. Means can be included to prevent the recording of areas from false peaks.

The invention will now be further described by way of example with reference to the accompanying drawings, in which:

FIG. 4 is a graph serving to illustrate the method according to the invention;

FIG. 5 is a block circuit diagram of a possible layout for putting the invention into practice;

FIG. 6 shows a more extreme possibility than FIGS. 2 and 3, of a curve of which the flanks are distorted.

Figure 1:
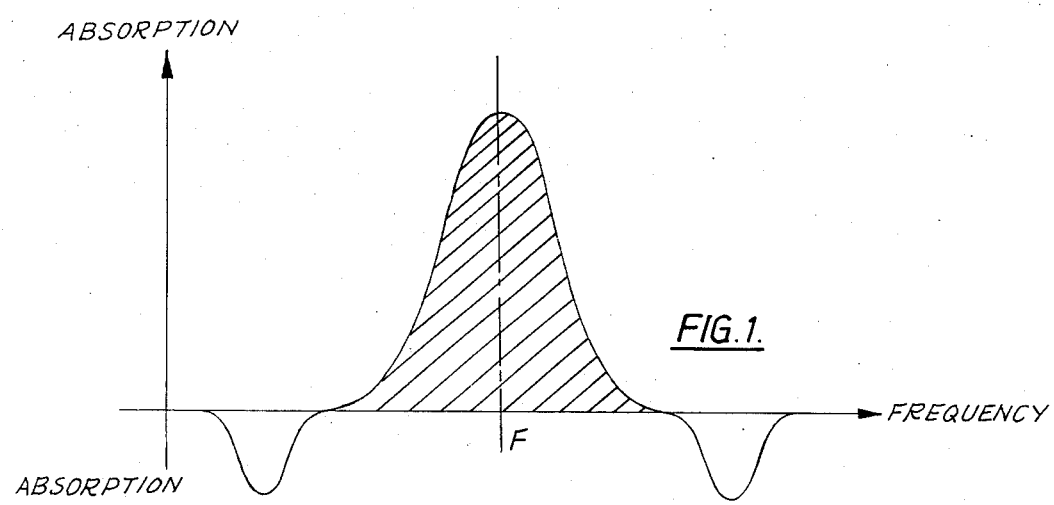
FIG. 1 shows an ideal Lorentzian curve with side lobes, obtained by analysing a sample of a gas by microwave spectroscopy employing Stark effect modulation.

Referring first to FIG. 1, this shows a typical result of spectrum analysis of the absorption spectrum of a gas by microwave technique employing Stark modulation. The horizontal axis represents frequency and the vertical axis shows the degree of absorption. Ideally the main central hump should be a very narrow and tall shape with vertical sides. However, for several reasons, some of them fundamental physical ones and some connected with the limitations of the spectrometer and the operating conditions, the narrow spectral line is spread out in practice over an appreciable width and takes the form of a so-called Lorentzian curve, which is a curve of known shape capable of mathematical definition. To obtain the true quantitative value of the absorption at the given frequency it is desirable not to measure simply the peak height but to integrate the total area under the curve, the area shown shaded in FIG. 1. This area represents the total absorption of energy by the gas.

Figure 2:
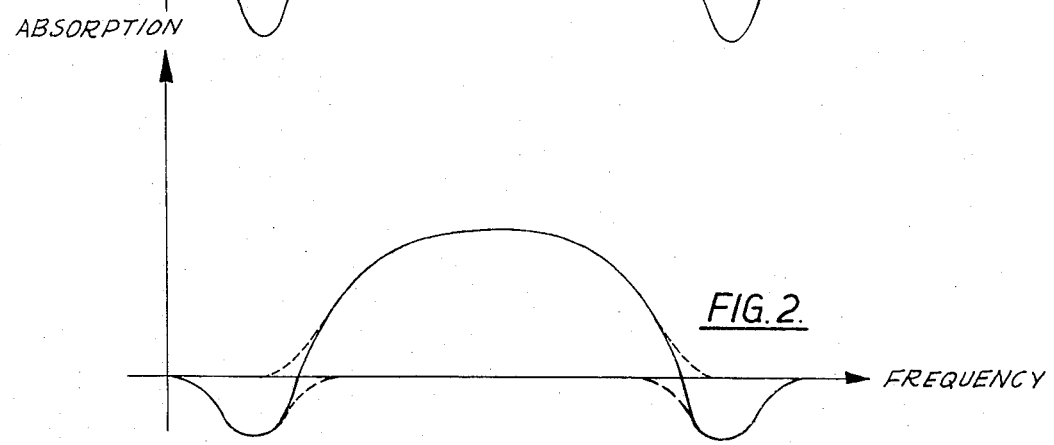
FIG. 2 shows a curve similar to that of FIG. 1 but broadened due to various unwanted effects, and consequently overlapping the lobes.
Figure 3:
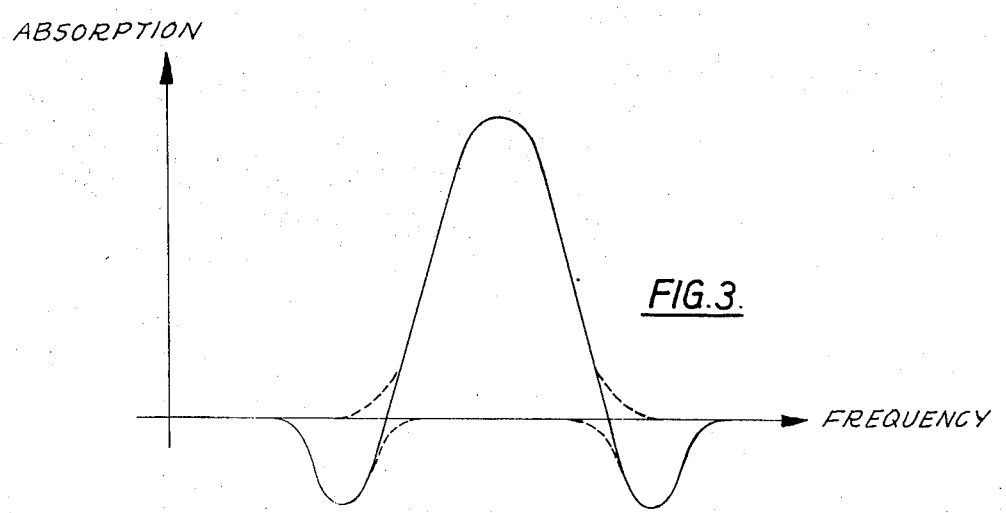
FIG. 3 shows a curve similar to that of FIG. 1 but with the lobes so close in frequency to the main curve that they overlap it.

In doing that there is no problem, even where there are also other curves alongside, such as the so-called Stark lobes shown to the left and right of the main curve in FIG. 1, as these curves can be treated separately. However, when the main curve is broad enough to overlap appreciably the side lobes (FIG. 2) or the lobes are so close in frequency to the main curve as to overlap it (FIG. 3), it will be seen that the flanks of the main curve are distorted. In FIGS. 2 and 3 the true curves are shown separately in broken lines and their combination, which would be the actual trace on an oscilloscope screen or an X - Y recorder chart, is shown in full lines.

In experimental procedure on individual traces it would be possible to make the necessary corrections by graphical methods. However this is not practical in routine commercial analysis procedure, which should be made automatic as far as possible. Accordingly, we propose that, instead of attempting to measure the area under the whole of the curve, we should, while making an assumption about its overall form (Lorentzian, Gussian or of other known form) but not about its absolute width or height, measure the area under only a restricted known portion of it, on one or both sides of the peak, down to a known fraction of the peak value.

Thus, in the curve shown in FIG. 4 we would measure the area shown at VPRS, where RS is a known fraction of VP (for example one half), then multiply by an appropriate factor to obtain the true value of the area under the whole curve, regardless of any distortions of that part of the curve below the value R.

The value of RS in relation to VP can be varied according to extent to which the distortion is expected. In a given situation it would be possible to make a series of test runs, each with a progressively decreasing value of the ratio RS : VP, multiplying the integrated area by an appropriate factor in each case, until the resulting values show a departure from the mean, indicating that one is in the distorted region. Such values can then be discarded. Clearly the lower the ratio, i.e. the wider the region measured, the greater is the accuracy of the integration, provided one is still clear of the distorted region.

Alternatively, the correction for the variation in the amount of curve integrated can be made by dividing the integrated area by an appropriate factor. This factor depends on the ratio RS:VP and division by such a factor of each area integrated should give a constant value. Again, any deviation from this mean would show that part of the distorted region of the curve had been integrated.

When the lobes overlap the main line to such an extent that even the peak is distorted, the area recorded will decrease as the finishing point R is set further from the peak maximum. Comparison of the several total peak areas can therefore give a check that sufficient Stark voltage is being used for meaningful area measurements to be obtained, and that no other interferences (e.g. overlapping peaks, partly resolved fine structure) are present.

It should be emphasised that we are making no assumption about the proportions of the curve, i.e. about its width in relation to its height, and we are not simply measuring the area between two fixed abscissa (horizontal axis) values. The sole criterion is the ratio between the peak value VP and the reduced value RS of the ordinate.

FIG. 5 shows the layout in block diagram form of one embodiment of the automatic apparatus for carrying out the invention. Such apparatus could employ a device such as a curve tracer 1, for scanning the curve of FIG. 4 from left to right until a maximum is detected, indicating that the peak has been reached. This is most easily done by differentiating the signal using a differentiator 2 as the scanning device moves at a constant speed along the horizontal axis, and then detecting electronically in a zero detector 3 when this differentiated signal passes through zero. The value of the main signal, i.e. of the peak value of the ordinate is observed at this instant and is held by a peak hold circuit 4 and applied as a voltage signal to the input 5 of a potentiometer 6 representing the value VP. The integration is at the same time started by a signal being applied to the switch 8 along the line 7 from the zero detector 3. A slider 10 on the potentiometer 6 has been set to a known fraction (for example one half) of the total resistance and therefore produces a signal representing the values RS. This is compared at 11 with the signal through the line 12 from the trace. When the trace signal falls to this value RS the integration is halted by applying a signal to the switch 8 along the line 13. The resulting total represents the area under the curve VPRS.

The integration is performed using an analogue integrator 9. As explained above, a correction has to be made to allow for the variation in the amount of the curve integrated and this involves the multiplication or division of the integrator output by the appropriate factor. This factor is determined by the selected ration of RS to VP and is therefore controlled by the position of the potentiometer slider 10. Normally the gain control of an operational amplifier (not shown) or the attention control of an attenuator (not shown) can be ganged to the potentiometer slider 10, so that the integrator output is automatically multiplied or divided by the appropriate factor to show the total area, which can then be displayed in analogue or digital form.

Where the integration is digital the output from the analogue integrator 9 is gated to produce output pulses which are fed to a digital counter (not shown) to give a total integral. The multiplication or division is then carried out using a multiplier or divider whose control is ganged to the potentiometer slider 10. (The step of multiplication or division in both the analogue or digital integration is indicated at 15.)

The details of the logic circuits employed are not shown as these will be readily understood by those skilled in the art. They comprise the normal standard logical circuit elements connected to perform the required steps, and including time delays and other standard elements as necessary. When the integration is complete the result is printed out automatically by the printer 14.

In a typical case the potentiometer (together with the multiplier) could have five preset values to which it can be switched. Where the curve is assumed to be Lorentzian the following are the related values for the RS/VP ratio and the amplification factor to obtain a constant value related to the total area (this value being the area under the curve to the half-height points; i.e. where the points RS/VP = ½)

RS/VP — Factor
0.9760 — 5
0.9046 — 4
0.7938 — 3
0.6545 — 2
0.5 — 1

Where the curve is Gaussian a different set of relationships would apply and these are tabulated below:

RS/VP — Factor
0.9925 — 5
0.9657 — 4
0.9291 — 3
0.8719 — 2
0.7964 — 1

Whilst we speak of scanning or tracing the curve, and we show in FIG. 5 a curve tracer, it should be understood that it is not necessary for the curve to be actually visible as a trace on an oscilloscope screen or a chart at any one given time. For example, in spectroscopy, the frequency of the exciting source may be traversed slowly over a range of frequencies whilst the resulting absorption is measured by a detector, and as the source frequency passes through the frequency of a resonant mode of the material under examination the signal in the detector will rise and then fall again in a Lorentzian manner. In this case the curve only exists in time, not as a two-dimensional physical entity, but the instrument can be regarded as a curve tracer in that the change in frequency of the source represents travel along the abscissa axis and the signal in the detector gives the ordinate value.

The experimental curves obtained may not always be as straightforward as that shown in FIG. 4. For example they could take the form shown in FIG. 6. In that case the simple circuit of FIG. 5 would detect (incorrectly) the false peak A and start the integration too soon. This can be overcome by suitable refinements in the circuit, for example by incorporating a threshold value (T) of the ordinate, and arranging for the circuit to ignore any peaks occurring below that threshold. This threshold is preferably manually variable to allow the user to set it to a value only slightly below the expected minimum value of peak to be detected.

Figure 7:
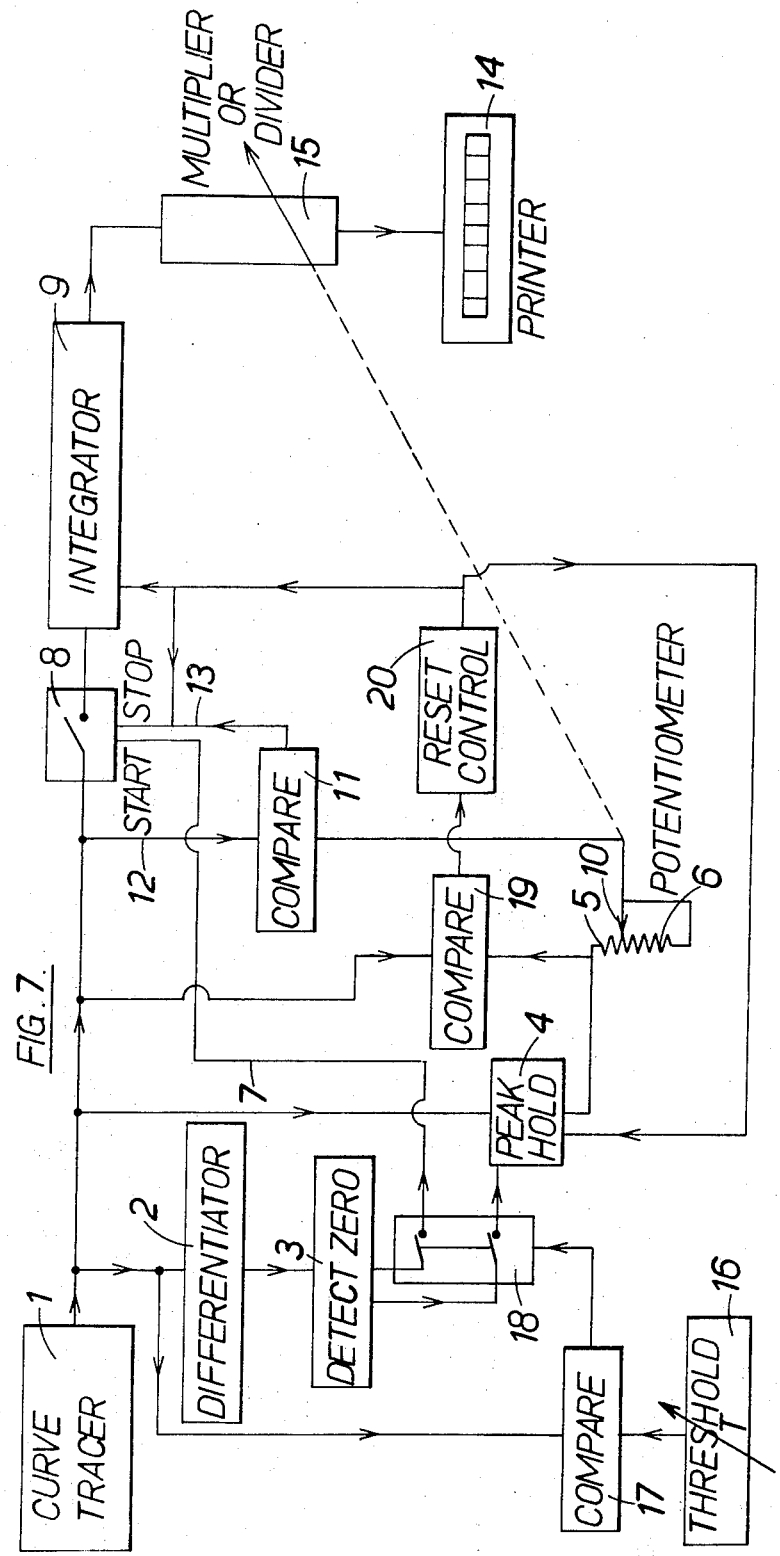
FIG. 7 shows a refined version of the circuit of FIG. 5.

A circuit which does this is shown in FIG. 7. A manually variable threshold value T is generated at 16 and is compared at 17 with the electrical signal from the curve tracer 1. A pair of ganged switches 18 are maintained in the open position until the electrical signal exceeds the threshold value T, when the switches 18 are closed by the unit 17. Thus the initiation of an integration sequence is prevented initially by the open switches 18.

Again, it is possible to reject also those false peaks, such as that at B in FIG. 6, which lie above the threshold, if the signal fails to fall as low as the pre-set value RS before rising to the (higher) true peak. In that case means can be provided for detecting the fact that, before the integration has been stopped, the signal has risen higher than the already-detected peak value. When that event occurs (at the point C in FIG. 6) the whole circuit is re-set and the integrator returns to zero without any total being printed out. The circuit is then ready to detect and respond to the true peak. The circuit of FIG. 7 incorporates one possible arrangement for doing this. The electrical signal from the curve tracer 1 is compared at 19 with a previously recorded and held peak value. If the electrical signal rises substantially above that recorded peak value the unit 19 acts by means of reset control 20 to re-set the whole circuit so that the integration sequence can begin again when antoher peak value is traced.

In practice, to eliminate any erratic behavior due to "noise" i.e. small spikes, in the neighbourhood of true peaks we preferably arrange that the re-setting action is only initiated if, during integration, the input signal rises at least 10 percent above the previously detected peak.

It will be apparent from the description above that the invention is not limited in its application to microwave spectroscopy or to Lorentzian curves, but may be applied to the analysis of any data in the form of curves of known basic type and liable to be subjected to partial distortion. In microwave spectroscopy, however, the invention is of particular value in that it allows quantitative analysis of gas mixtures over a wide range of total pressures and power densities by the use of automatic integrating instruments.

We claim:

1. Apparatus for assessing the true integrated area under a peaked curve of assumed type but not of predetermined peak height and width, representing observed or measured physical data and known to be liable to distortion of its flanks, said apparatus comprising in combination means for tracing a humped curve along the abscissa axis thereof, and obtaining an electrical signal dependent on the value of the ordinate value of said curve, means for detecting the peak value of the ordinate and starting an integrating sequence of the area under the curve from that peak value, means deriving a signal representing a predetermined fraction of said peak value, and means for halting the integration when the ordinate of the curve has fallen to said fraction.

2. Apparatus as set forth in claim 1 wherein said means for detecting the peak value comprises a differentiator responsive to said electrical signal from said curve tracing means.

3. Apparatus as set forth in claim 1 including threshold means responsive to said electrical signal from said curve tracing means for preventing the initiation of an integration sequence when said electrical signal is less than a predetermined threshold value thereby preventing the recording of areas from curves having peaks below said threshold value.

4. Apparatus as set forth in claim 1 including reset means responsive to said electrical signal from said curve tracing means for preventing recording of areas from curves when said electrical signal rises substantially above a previously recorded peak value during the curve tracing sequence.

5. Apparatus as set forth in claim 1 including means for modifying the result of the integration by a factor related to the said fraction such as to produce a figure for the integrated area which, for an integration over an undistorted part of the curve, is constant regardless of the value of said fraction.

6. Apparatus as set forth in claim 1 wherein said means deriving a signal representing a predetermined fraction of said peak value of the ordinate are switchable between a number of predetermined fixed values of said fraction.

* * * * *